(12) United States Patent
Peng et al.

(10) Patent No.: US 12,232,148 B2
(45) Date of Patent: Feb. 18, 2025

(54) SIDELINK DATA TRANSMISSION METHOD AND DEVICE

(71) Applicant: VIVO MOBILE COMMUNICATION CO., LTD., Chang'an Dongguan (CN)

(72) Inventors: Shuyan Peng, Chang'an Dongguan (CN); Zichao Ji, Chang'an Dongguan (CN); Huaming Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 407 days.

(21) Appl. No.: 17/583,334

(22) Filed: Jan. 25, 2022

(65) Prior Publication Data

US 2022/0225353 A1 Jul. 14, 2022

Related U.S. Application Data

(63) Continuation of application No. PCT/CN2020/102992, filed on Jul. 20, 2020.

(30) Foreign Application Priority Data

Jul. 29, 2019 (CN) .......................... 201910691372.6

(51) Int. Cl.
*H04W 72/52* (2023.01)

(52) U.S. Cl.
CPC .................................. *H04W 72/52* (2023.01)

(58) Field of Classification Search
CPC ..... H04W 72/52; H04W 72/20; H04W 92/18; H04L 5/0053; H04L 5/0048
See application file for complete search history.

(56) References Cited

U.S. PATENT DOCUMENTS

| | | | |
|---|---|---|---|
| 2015/0327157 A1 | 11/2015 | Al-Shalash | |
| 2019/0141647 A1 | 5/2019 | Nimbalker et al. | |
| 2019/0364585 A1* | 11/2019 | Lee | H04W 4/40 |
| 2021/0127377 A1* | 4/2021 | Lee | H04L 27/2602 |

FOREIGN PATENT DOCUMENTS

| | | | |
|---|---|---|---|
| CN | 106465090 A | 2/2017 | |
| CN | 108632782 A | 10/2018 | |
| CN | 111263454 A | 6/2020 | |
| EP | 3780720 A1 * | 2/2021 | .......... H04L 1/0007 |
| WO | 2018175842 A1 | 9/2018 | |
| WO | 2018182365 A1 | 10/2018 | |
| WO | WO-2019024865 A1 * | 2/2019 | ............... H04L 1/00 |

OTHER PUBLICATIONS

3GPP TS 38.214 V15.6.0 (Jun. 2019); 3rd Generation Partnership Project; Technical Specification Group Radio Access Network; NR; Physical layer procedures for data (Release 15).

(Continued)

*Primary Examiner* — Mandish K Randhawa
(74) *Attorney, Agent, or Firm* — von Briesen & Roper, s.c.

(57) ABSTRACT

A sidelink data transmission method and a device are provided. The method may be performed by a terminal device and includes: calculating a TBS based on a size of an allocated resource and a target resource overhead; and transmitting sidelink data based on the calculated TBS.

20 Claims, 2 Drawing Sheets

100

Calculate a TBS based on a size of an allocated resource and a target resource overhead — S102

Transmit sidelink data based on the calculated TBS — S104

(56) References Cited

OTHER PUBLICATIONS

First Chinese Office Action related to Application No. 201910691372.6 reported on Apr. 6, 2021.
Second Chinese Office Action related to Application No. 201910691372.6 reported on Oct. 27, 2021.
R1-1907888, Source: Intel Corporation, "Summary#3 for AI 7.2.42.2 Mode-2 Resource Allocation" Agenda item: 7.2.4.2.2, Document for: Discussion and Decision, Release: 3GPP TSG-RAN WG1 Meeting #97, May 13-17, 2019 Reno, USA.
R1-2000914, Source: NTT DOCOMO, Inc., "Remaining issues on sidelink physical layer structure" Agenda item: 7.2.4.1, Document for: Discussion and Decision, Release: 3GPP TSG-RAN WG1 Meeting #100 e-Meeting, Feb. 24-Mar. 6, 2020.
R1-2002323, Source; Apple, "On Remaining Details of NR V2X Physical Layer Structure" Document for: Discussion and Decision, Agenda item: 7.2.4.1, Release: 3GPP TSG-RAN WG1 #100bis e-Meeting, Apr. 20-30, 2020.
R1-2002361, Source: NEC, "Remaining issues on physical layer structure" Document for: Discussion/Decision Agenda item: 7.2.4.1, Release: 3GPP TSG-RAN WG1 #100bis e-Meeting. Apr. 20-30, 2020.
International Search Report and Written Opinion related to Application No. PCT/CN2020/102992 reported on Jul. 20, 2020.

\* cited by examiner

SIDELINK DATA TRANSMISSION METHOD AND DEVICE

CROSS REFERENCE TO RELATED APPLICATIONS

This application is continuation application of PCT International Application No. PCT/CN2020/102992 filed on Jul. 20, 2020, which claims priority to Chinese Patent Application No. 201910691372.6 filed in China on Jul. 29, 2019, the disclosures of which are incorporated herein by reference in their entireties.

TECHNICAL FIELD

Embodiments of the present disclosure relate to the communications field, and in particular, to a sidelink data transmission method and a device.

BACKGROUND

Long Term Evolution (LTE) sidelink communication is performed based on broadcast. It can be used for basic safety-related communications of vehicle to everything (V2X), but it is not applicable to higher-level V2X services. A New Radio (NR) system supports more advanced designs of sidelink transmission, such as unicast, broadcast or groupcast, and the like, so as to support more comprehensive service types.

For a terminal device, a transport block size (TBS) needs to be calculated during a sidelink data transmission process. At present, in an NR system, how to accurately calculate a TBS for sidelink data transmission is a technical problem urgently need to be solved in the related art.

SUMMARY

According to a first aspect, a sidelink data transmission method is provided, where the method is performed by a terminal device and includes:
  calculating a TBS based on a size of an allocated resource and a target resource overhead; and
  transmitting sidelink data based on the calculated TBS.

According to a second aspect, a terminal device is provided and includes:
  a TBS calculation module, configured to calculate a TBS based on a size of an allocated resource and a target resource overhead;
  a transmission module, configured to transmit sidelink data based on the calculated TBS.

According to a third aspect, a terminal device is provided, where the terminal device includes a processor, a memory, and a computer program that is stored in the memory and that can run on the processor, and when the computer program is executed by the processor, steps of the sidelink data transmission method in the first aspect are implemented.

According to a fourth aspect, a computer-readable storage medium is provided, where the computer-readable storage medium stores a computer program, and when the computer program is executed by a processor, steps of the sidelink data transmission method in the first aspect are implemented.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings.

DESCRIPTION OF EMBODIMENTS

To make the objectives, technical solutions, and advantages of this application clearer, the following clearly describes the technical solutions of this application with reference to the specific embodiments of this application and the corresponding accompanying drawings. Apparently, the described embodiments are merely some rather than all of the embodiments of this application. All other embodiments obtained by a person of ordinary skill in the art based on the embodiments of this application shall fall within the protection scope of this application. The term "and/or" in the embodiments of the present disclosure indicates at least one of a former one and a latter one.

It should be understood that, the technical solutions in the embodiments of the present disclosure may be applied to various communications systems, such as an LTE sidelink system, an NR sidelink system, or a subsequently evolved sidelink communications system.

In the embodiments of the present disclosure, a terminal device may include but is not limited to a mobile station (MS), a mobile terminal, a mobile telephone, user equipment (UE), a handset, portable equipment, a vehicle, and the like. The terminal device may communicate with one or more core networks by using a radio access network (RAN). For example, the terminal device may be a mobile phone (or referred to as a "cellular" phone), or a computer having a wireless communication function; or the terminal device may be a portable, pocket-sized, handheld, computer built-in, or in-vehicle mobile apparatus.

Figure 1:
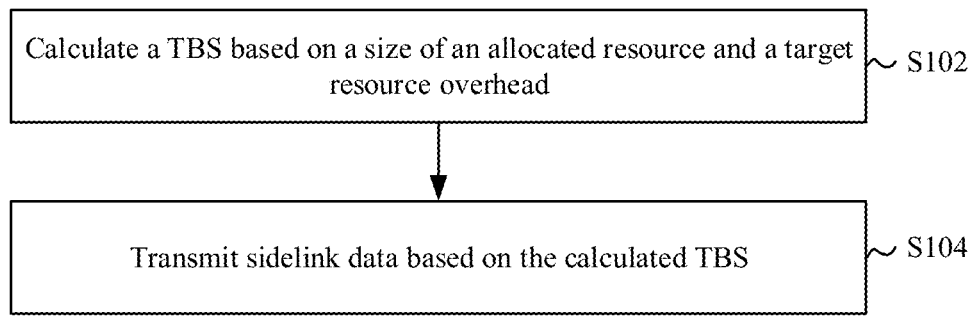
FIG. 1 is a schematic flowchart of a sidelink data transmission method according to an embodiment of the present disclosure.

As shown in FIG. 1, the present disclosure provides a sidelink data transmission method 100. The method may be performed by a terminal device, and includes steps S102 and S104.

S102: Calculate a Transport Block Size (TBS) based on a size of an allocated resource and a target resource overhead.

Generally, a TBS mainly depends on a size of an allocated resource. Optionally, an allocated resource is composed of one or a plurality of resource blocks (RB). One RB occupies a plurality of symbols in time domain and a plurality of subcarriers in frequency domain.

In the embodiments of this specification, the target resource overhead may include at least one of the following:
  a resource overhead of a physical sidelink control channel (PSCCH);
  a resource overhead of a physical sidelink feedback channel (PSFCH);
  a resource overhead of sidelink feedback control information (SFCI), where the SFCI may include at least one of a HARQ ACK/NACK and a channel state information report;
  a resource overhead of a demodulation reference signal (DMRS);

a resource overhead of a phase-tracking reference signal (PTRS);

a resource overhead of a channel state information-reference signal (CSI-RS);

a resource overhead of automatic gain control (AGC); and a resource overhead of a guard period (GP).

Optionally, the target resource overhead may include at least one of the resource overhead of the PSFCH and the resource overhead of the SFCI reused in the PSSCH, where the resource overhead of the SFCI herein includes a resource overhead for transmitting a CSI report, and the resource overhead of the PSFCH herein includes a resource overhead for transmitting a HARQ ACK/NACK.

For example, an upper layer configures an available resource for the PSFCH, and the terminal device obtains, based on information configured by the upper layer, a slot(s) for configuring the resource for the PSFCH. In a case that the terminal device has used the slot(s) to transmit the PSSCH, an overhead of the resource configured for the PSFCH is subtracted during calculation of the TBS.

It should be noted that, if the PSFCH is not in allocated symbols for the PSSCH, the resource overhead of the PSFCH does not need to be considered during calculation of the TBS.

In a specific example, in this step, the foregoing target resource overhead may be subtracted from the allocated resource during calculation of the TBS.

For example, during a process of calculating the TBS, a certain value is subtracted based on the size of the allocated resource. The value is related to the foregoing target resource overhead. During the subtraction calculation process, the subtrahend may be the foregoing allocated resource, or may be another value used during the calculation process.

For another example, in a process of calculating the TBS, a scale factor is multiplied based on the size of the allocated resource. The scale factor is related to the foregoing target resource overhead and greater than 0 and less than or equal to 1. During the multiplication calculation process, the multiplicand may be the foregoing allocated resource, or may be another value used during the calculation process.

S104: Transmit sidelink data based on the calculated TBS.

In this step, the sidelink data is transmitted based on the calculated TBS. Specifically, the sidelink data may be sent or received during the sidelink data transmission.

In this step, for a transmitting terminal device, the sidelink data may be sent by a transceiver based on the calculated TBS; and for a receiving terminal device, the sidelink data may be obtained through demodulation based on the calculated TBS.

According to the sidelink data transmission method provided in the present disclosure, a terminal device can calculate a TBS based on a size of an allocated resource and a target resource overhead, and transmitting sidelink data based on the calculated TBS. According to this embodiment of the present disclosure, the target resource overhead in the allocated resource is fully considered during calculation of a TBS, helping improve accuracy of the calculated TBS.

For the receiving terminal device, in this embodiment of the present disclosure, a case in which a transmission bit rate of a transmission block exceeds a bit rate allowed during demodulation can be avoided, a success rate of decoding is increased, and communication efficiency is improved.

Optionally, the target resource overhead mentioned in the foregoing embodiment may include the resource overhead of the PSCCH. The resource overhead of the PSCCH may be calculated based on configuration of the PSCCH.

Certainly, the foregoing target resource overhead may further include the resource overhead of the PSFCH, the resource overhead of the SFCI, or the like. For example, when the target resource overhead includes the resource overhead of the SFCI, during calculation of the TBS in step S102, the resource overhead of the SFCI can be determined based on indication of sidelink control information (SCI) and used to calculate the TBS.

Optionally, when the foregoing target resource overhead includes the resource overhead of the PSCCH, and before step S102 is performed, the following steps may be further included:

(1) Calculate the resource overhead of the PSCCH based on a resource occupied by the PSCCH during blind detection; or (2) Calculate a total resource overhead of the PSCCH based on a first resource overhead of a first PSCCH and a second resource overhead of a second PSCCH, where the total resource overhead may be specifically a sum of the first resource overhead and the second resource overhead, the first PSCCH may be predefined or may be configured or preconfigured by a network device, and the second PSCCH is indicated by the first PSCCH.

Optionally, the first PSCCH may explicitly or implicitly indicate the second PSCCH.

For example, the first PSCCH includes indication information, and the indication information indicates whether the second PSCCH is included and information such as a resource size or resource location of the second PSCCH, that is, explicit indication is used.

For another example, the first PSCCH may indicate a transmission type (for example, unicast, groupcast, or broadcast). If the transmission type is unicast/groupcast, it indicates that the second PSCCH exists, and the second resource overhead of the second PSCCH is determined based on a preconfigured resource size of the second PSCCH, that is, implicit indication is used.

Optionally, in parallel to the foregoing embodiments, when the sidelink data is retransmission sidelink data, a TBS for initial transmission of the sidelink data may be used as a TBS of the retransmission sidelink data, and retransmission of the sidelink data is performed based on the TBS for the initial transmission of the sidelink data.

For example, if a TB of the sidelink data meets $28 \leq I_{MCS} \leq 31$, a size of the TB (TBS) is determined from the latest SCI for the same TB, where when $I_{MCS}$ meets $28 \leq I_{MCS} \leq 31$, the TBS is used for retransmission of the sidelink data; and when $I_{MCS}$ meets $0 \leq I_{MCS} \leq 28$, the TBS is used for initial transmission of the sidelink data.

Optionally, in the plurality of foregoing embodiments, the calculating a TBS based on a size of an allocated resource and a target resource overhead may include at least one of the following:

Manner (1): Subtract a first parameter from a quantity of allocated symbols to calculate a quantity of available resource elements (RE) in a physical resource block (PRB), and calculate the TBS based on the quantity of available REs in the PRB, where the allocated resource includes the quantity of allocated symbols.

Manner (2): Subtract a second parameter from a quantity of available REs in the allocated resource, and calculate the TBS based on an obtained value, where the quantity of available REs in the allocated resource is calculated based on the size of the allocated resource. In this manner, the quantity of available REs in the allocated resource may be calculated in the foregoing manner (1), or may be calculated in another manner.

Manner (3): Multiply a third parameter by the quantity of available REs in the allocated resource, and calculate the TBS based on an obtained value, where the quantity of available REs in the allocated resource is calculated based on the size of the allocated resource. In this manner, the quantity of available REs in the allocated resource may be calculated in the foregoing manner (1), or may be calculated in another manner.

Manner (4): Multiply a fourth parameter by a quantity of available PRBs in the allocated resource, and calculate the TBS based on an obtained value.

Manner (5): Multiply an information median by a fifth parameter, and calculate the TBS based on an obtained value, where the information median is calculated based on the size of the allocated resource. In this manner, the information median is calculated based on the quantity of available REs in the allocated resource. The quantity of available REs in the allocated resource may be calculated in the foregoing manners (2) and (3), or may be calculated in another manner.

The first parameter, the second parameter, the third parameter, the fourth parameter, and the fifth parameter are all related to the target resource overhead mentioned in the foregoing description, and the third parameter, the fourth parameter, and the fifth parameter are all greater than 0 and less than or equal to 1.

To describe the sidelink data transmission method provided in the present disclosure in detail, a calculation process of the TBS is described in detail below with reference to several specific embodiments.

Embodiment 1

1. Calculate a quantity of available REs in each PRB based on the following formula:

$$N'_{RE} = N_{sc}^{RB} \cdot (N_{symbol}^{sh} - N_{oh\_sym}) - N_{DMRS}^{PRB} - N_{oh}^{PRB}$$

where $N'_{RE}$ denotes a quantity of available REs in a PRB; $N_{sc}^{RB}$ denotes a quantity of subcarriers in a PRB and is generally 12; $N_{symbol}^{sh}$ an denotes a quantity of allocated symbols; $N_{oh\_sym}$ denotes a quantity of symbols related to the target resource overhead and corresponds to the first parameter in the foregoing description; $N_{DMRS}^{PRB}$ denotes a resource overhead of a DMRS in a PRB; $N_{oh}^{PRB}$ is a parameter predefined in a protocol, (pre)configured by a network device, configured by a terminal device, or obtained through negotiation or feedback.

(a) In this embodiment, optionally, $N_{oh\_sym} = 1$. For example, $N_{oh\_sym}$ denotes a resource overhead of a GP and/or AGC.

Alternatively, optionally, a mapping relationship between numerology and $N_{oh\_sym}$ may be predefined as follows:

if a carrier frequency is FR1, and SCS=15 kHz, $N_{oh\_sym}=1$;
if the carrier frequency is FR1, and SCS=30 kHz, $N_{oh\_sym}=2$;
if the carrier frequency is FR1, and SCS=60 kHz, $N_{oh\_sym}=2$;
if the carrier frequency is FR2, and SCS=60 kHz, $N_{oh\_sym}=1$; or
if the carrier frequency is FR2, and SCS=120 kHz, $N_{oh\_sym}=2$.

(b) Optionally, an optional value of $N_{oh}^{PRB}$ is 0, 6, 12, or 18. The terminal device may determine the resource overhead based on a transmission type. For example:

if the transmission type is broadcast transmission, $N_{oh}^{PRB}$ is configured to be 0 by default;

if the transmission type is unicast transmission, the transmitting terminal device selects an overhead value of $N_{oh}^{PRB}$ based on configuration; or if the transmission type is multicast transmission, $N_{oh}^{PRB}$ is configured to be 0 by default.

2. Calculate a quantity of available REs in all PRBs in the allocated resource based on the following formula: $N_{RE} = \min(156, N'_{RE}) \cdot n_{PRB}$.

where $N_{RE}$ denotes the quantity of available REs in all PRBs in the allocated resource, for example, a quantity of available REs in all PRBs in a slot; and $n_{PRB}$ denotes a quantity of available PRBs.

3. Calculate an information median based on the following formula: $N_{inf\ o} = N_{RE} \cdot R \cdot Q_m \cdot \upsilon$ where R denotes a bit rate, $Q_m$ denotes a modulation order, and $\upsilon$ denotes a quantity of layers.

When $N_{inf\ o} \leq 3824$, the TBS is obtained through the following step 4. Otherwise, the TBS is obtained through the following step 5.

4. When the information median meets $N_{inf\ o} \leq 3824$, a quantized median $$N'_{inf\ o} = \max\left(24, 2^n \cdot \left\lfloor \frac{N_{inf\ o}}{2^n} \right\rfloor\right)$$

is obtained, where $n = \max(3, \lfloor \log_2(N_{inf\ o}) \rfloor - 6)$; and then a last TBS that is not less than the quantized median $N'_{inf\ o}$ is found in the following Table 1.

5. When the information median meets $N_{inf\ o} > 3824$, the quantized median meets $$N'_{inf\ o} = \max\left(3840, 2^n \times \text{round}\left(\frac{N_{inf\ o} - 24}{2^n}\right)\right),$$

where $n = \lfloor \log_2(N_{inf\ o} - 24) \rfloor - 5$; and then the TBS is determined based on the quantized median $N'_{inf\ o}$.

In this embodiment, optionally, if the transmission type is unicast sidelink transmission, the transmitting terminal device may send SCI or sidelink radio resource control (SL-RRC), to indicate an overhead of $N_{oh}^{PRB}$ to the receiving terminal device.

Optionally, the receiving terminal device determines the overhead of $N_{oh}^{PRB}$ based on the transmission type, and calculates the TBS. Specifically, for example:

if the transmission type is broadcast transmission, $N_{oh}^{PRB}$ is configured to be 0 by default;

if the transmission type is unicast transmission, the transmitting terminal device selects an overhead value based on configuration, and sends SCI/SL-RRC to indicate the overhead of $N_{oh}^{PRB}$; or if the transmission type is multicast transmission, $N_{oh}^{PRB}$ is configured to be 0 by default.

In Embodiment 1, during calculation of the TBS, $N_{oh\_sym}$ is subtracted from a quantity of allocated symbols to calculate a quantity of available REs in a PRB, and the TBS is subsequently calculated based on the obtained quantity of available REs.

TABLE 1

TBSs obtained when an information median meets $N_{inf_o} \leq 3824$

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 25 | 256 |
| 27 | 272 |
| 2S | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 5S | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Specifically, in step 2 to step 5 in Embodiment 1, a TBS calculation process for the Uu interface, for example, a TBS calculation process for the PUSCH, may be used.

Optionally, in Embodiment 1, $N_{oh\_sym}$ is related to at least one of feedback information configuration, PSCCH configuration, AGC configuration, PTRS configuration, CSI-RS configuration, a carrier frequency, numerology configuration, CSI configuration, and a transmission type. Alternatively, $N_{oh\_sym}$ is a value predefined in a protocol, (pre) configured by a network device or terminal device, obtained through negotiation by the terminal device, or fed back by the receiving terminal device to the transmitting terminal device.

Specifically, for example, in step 1 in Embodiment 1, a quantity of symbols for a GP may be subtracted from a quantity of allocated symbols for a PSSCH. The quantity of symbols for the GP may be one symbol or half a symbol. Optionally, a mapping relationship between numerology and a GP and/or AGC is defined as follows:
  if a carrier frequency is FR1, and SCS=15 kHz, a resource overhead of the AGC is half a symbol, and an overhead of the GP is half a symbol;
  if the carrier frequency is FR1, and SCS=30 kHz, the resource overhead of the AGC is one symbol, and the resource overhead of the GP is half a symbol;
  if the carrier frequency is FR1, and SCS=60 kHz, the resource overhead of the AGC is one symbol, and the overhead of the GP is one symbol;
  if the carrier frequency is FR2, and SCS=60 kHz, the resource overhead of the AGC is one symbol, and the overhead of the GP is half a symbol; or
  if the carrier frequency is FR2, and SCS=120 kHz, the resource overhead of the AGC is one symbol, and the overhead of the GP is one symbol.

For another example, in step 1 in Embodiment 1, a quantity of symbols for the AGC may be subtracted from a quantity of allocated symbols for the PSSCH. The quantity of symbols for the AGC may be one symbol, half a symbol, or two symbols. For another example, based on configuration of the PSFCH, in a case that a resource for the PSFCH is configured in the allocated resource, in step 1 in Embodiment 1, a quantity of symbols for the PSFCH may be subtracted from the quantity of allocated symbols for the PSSCH.

For still another example, in step 1 in Embodiment 1, a certain symbol overhead may be subtracted from a quantity of symbols allocated for the PSSCH, and the symbol overhead is half a symbol or one symbol, and is used to indicate that a symbol overhead of at least one of the CSI-RS, PTRS, SFCI, CSI, and PSCCH is subtracted. The symbol overhead may be (pre)configured by a network device or configured by a terminal device.

It should be noted that, the foregoing description uses only one resource overhead as examples. Actually, $N_{oh\_sym}$ may be a sum of a plurality of resource (symbol) overheads, for example, $N_{oh\_sym}$ is a sum of symbol overheads of the AGC, the GP, and the like.

Embodiment 2

1. Calculate a quantity of available REs in each PRB based on the following formula:

$$N'_{RE} = N_{sc}^{RB} \cdot (N_{symbol}^{sh} - N_{oh\_sym}) - N_{DMRS}^{PRB} - N_{oh}^{PRB}$$

where $N'_{RE}$ denotes a quantity of available REs in a PRB; $N_{sc}^{RB}$ denotes a quantity of subcarriers in a PRB and is generally 12; $N_{symbol}^{sh}$ denotes a quantity of allocated symbols and may be specifically a quantity of allocated symbols in a slot for the PSSCH; $N_{oh\_sym}$ denotes a quantity of symbols related to the target resource overhead and corresponds to the first parameter in the foregoing description; $N_{DMRS}^{PRB}$ denotes a resource overhead of a DMRS in a PRB; $N_{oh}^{PRB}$ may be a parameter predefined in a protocol, (pre)configured by a network device, configured by a terminal device, or obtained through negotiation or feedback.

(a) In this embodiment, optionally, $N_{oh\_sym}=1$. For example, $N_{oh\_sym}$ denotes a symbol overhead of a GP and/or AGC.

Alternatively, optionally, a mapping relationship between numerology and a GP and/or AGC may be predefined as follows:
- if a carrier frequency is FR1, and SCS=15 kHz, a resource overhead of the AGC is half a symbol, and an overhead of the GP is half a symbol;
- if the carrier frequency is FR1, and SCS=30 kHz, the resource overhead of the AGC is one symbol, and the resource overhead of the GP is half a symbol;
- if the carrier frequency is FR1, and SCS=60 kHz, the resource overhead of the AGC is one symbol, and the overhead of the GP is one symbol;
- if the carrier frequency is FR2, and SCS=60 kHz, the resource overhead of the AGC is one symbol, and the overhead of the GP is half a symbol; or
- if the carrier frequency is FR2, and SCS=120 kHz, the resource overhead of the AGC is one symbol, and the overhead of the GP is one symbol.

(b) In this embodiment, optionally, an optional value of $N_{oh}^{PRB}$ is 0, 6, 12, or 18. The transmitting terminal device selects an overhead value of $N_{oh}^{PRB}$ based on configuration.

2. Calculate a quantity of available REs in all PRBs in the allocated resource based on the following formula: $N_{RE}=\min(156, N'_{RE}) \cdot n_{PRB}$, where $N_{RE}$ denotes the quantity of available REs in all PRBs, and $n_{PRB}$ denotes a quantity of available PRBs.

3. This step is the same as steps 3, 4, and 5 in Embodiment 1. Specifically, in step 2 and subsequent steps in Embodiment 2, a TBS calculation process for the Uu interface, for example, a TBS calculation process for the PUSCH, may be used.

In Embodiment 2, optionally, the transmitting terminal device may send SCI/SL-RRC to indicate a value of $N_{oh}^{PRB}$.

In this way, the receiving terminal device obtains the value of $N_{oh}^{PRB}$ to calculate the TBS.

According to Embodiment 2, during calculation of the TBS, $N_{oh\_sym}$ is subtracted from a quantity of allocated symbols to calculate a quantity of available symbols in a PRB; then a quantity of available REs is calculated based on the obtained quantity of available symbols and a frequency domain resource; and subsequently, the TBS is calculated based on the obtained quantity of available REs.

Embodiment 3

1. The receiving terminal device feeds back resource overheads of AGC and the like. For example, the resource overhead of the AGC is one symbol.

2. The transmitting terminal device determines $N_{oh\_sym}=1$ based on received feedback information and configuration information.

3. Calculate a quantity of available REs in each PRB based on the following formula:

$$N'_{RE} = N_{sc}^{RB} \cdot (N_{symbol}^{sh} - N_{oh\_sym}) - N_{DMRS}^{PRB} - N_{oh}^{PRB}$$

For meanings of the parameters in the formula, refer to step 1 in Embodiment 1. A difference lies in that, in this embodiment, $N_{oh\_sym}$ may be used to indicate resource overheads of at least one of the AGC, PSCCH, SFCI, DMRS, PTRS, CSI-RS, and GP. For example, $N_{oh\_sym}$ denotes the overheads of the GP and/or the AGC. In this embodiment, $N_{oh\_sym}=1$.

In this embodiment, an optional value of $N_{oh}^{PRB}$ is 0, 6, 12, or 18. The transmitting terminal device selects an overhead value of $N_{oh}^{PRB}$ based on configuration.

4. Calculate a quantity of available REs in all PRBs in the allocated resource based on the following formula: $N_{RE}=\min(156, N'_{RE}) \cdot n_{PRB}$.

For meanings of the parameters in the formula, refer to step 2 in Embodiment 1.

5. This step is the same as steps 3, 4, and 5 in Embodiment 1. Specifically, in step 4 and subsequent steps in this embodiment, a TBS calculation process for the Uu interface, for example, a TBS calculation process for the PUSCH, may be used.

According to Embodiment 3, during calculation of a TBS, $N_{oh\_sym}$ is subtracted from a quantity of allocated symbols to calculate a quantity of available REs in a PRB, and the TBS is subsequently calculated based on the obtained quantity of available REs.

In Embodiment 3, $N_{oh\_sym}$ is obtained based on feedback from the receiving terminal device.

Embodiment 4

1. Calculate a quantity of available REs in each PRB based on the following formula:

$$N'_{RE} = N_{sc}^{RB} \cdot (N_{symbol}^{sh} - N_{oh\_sym}) - N_{DMRS}^{PRB} - N_{oh}^{PRB}$$

For meanings of the parameters in the formula, refer to step 1 in Embodiment 1.

In this embodiment, optionally, $N_{oh\_sym}=2$. $N_{oh\_sym}$ may be used to indicate resource overheads of at least one of the AGC, PSCCH, SFCI, DMRS, PTRS, CSI-RS, and GP. Specifically, $N_{oh\_sym}$ in this embodiment is used to indicate the resource overhead of the GP and/or AGC and the resource overhead of the PSFCH.

Optionally, $N_{oh\_sym}$ may alternatively be determined based on configuration of the PSFCH. A relationship between a configuration relationship and $N_{oh\_sym}$ is predefined. For example, in a case that a resource for the PSFCH is configured in the allocated resource, $N_{oh\_sym}=2$; Otherwise, $N_{oh\_sym}=1$.

2. Calculate a quantity of available REs in all PRBs in the allocated resource based on the following formula: $N_{RE}=\min(156,N'_{RE}) \cdot n_{PRB}$.

For meanings of the parameters in the formula, refer to step 2 in Embodiment 1.

3. This step is the same as steps 3, 4, and 5 in Embodiment 1. Specifically, in step 2 and subsequent steps in this embodiment, a TBS calculation process for the Uu interface, for example, a TBS calculation process for the PUSCH, may be used.

Optionally, in this embodiment, if the PSFCH is not included in allocated symbols for the PSSCH, the overhead of the PSFCH does not need to be considered when $N_{oh\_sym}$ is determined.

Embodiment 5

1. Calculate a quantity of available REs in each PRB based on the following formula:

$$N'_{RE}=N_{sc}^{RB} \cdot N_{symbol}^{sh} - N_{DMRS}^{PRB} - N_{oh}^{PRB} - N$$

where $N'_{RE}$ denotes a quantity of available REs in a PRB; $N_{sc}^{RB}$ denotes a quantity of subcarriers in a PRB and is generally 12; $N_{symbol}^{sh}$ denotes a quantity of allocated symbols and may be specifically a quantity of allocated symbols for the PSSCH; $N_{DMRS}^{PRB}$ denotes a resource overhead of a DMRS in a PRB; $N_{oh}^{PRB}$ is a parameter predefined in a protocol, (pre)configured by a network device, configured by a terminal device, or obtained through negotiation or feedback; and N is a parameter related to the target resource overhead.

In this embodiment, optionally, N=12. For example, N denotes resource overheads of a GP and/or AGC. Alternatively, optionally, a mapping relationship between numerology and N may be predefined as follows:

if a carrier frequency is FR1, and SCS=15 kHz, N=12;
if the carrier frequency is FR1, and SCS=30 kHz, N=24;
if the carrier frequency is FR1, and SCS=60 kHz, N=24;
If the carrier frequency is FR2, and SCS=60 kHz, N=12; or
if the carrier frequency is FR2, and SCS=120 kHz, N=24.

2. Calculate a quantity of available REs in all PRBs in the allocated resource based on the following formula: $N_{RE}=\min(156,N'_{RE}) \cdot n_{PRB}$ For meanings of the parameters in the formula, refer to step 2 in Embodiment 1.

3. This step is the same as steps 3, 4, and 5 in Embodiment 1. Specifically, in step 2 and subsequent steps in this embodiment, a TBS calculation process for the Uu interface, for example, a TBS calculation process for the PUSCH, may be used.

In Embodiment 5, during calculation of a TBS, N is subtracted from a quantity of available REs in a PRB, and the TBS is subsequently calculated based on an obtained value.

Optionally, in Embodiment 5, N is related to at least one of feedback information configuration, PSCCH configuration, AGC configuration, PTRS configuration, CSI-RS configuration, a carrier frequency, numerology configuration, CSI configuration, and a transmission type. Alternatively, N is a value predefined in a protocol, configured by a network device or terminal device, obtained through negotiation by the terminal device, or fed back by the receiving terminal device to the transmitting terminal device.

For example, the network device preconfigures a mapping relationship between numerology and N or between N and a quantity of symbols for the AGC; and the terminal device obtains N based on the configured numerology or the configured quantity of symbols for the AGC, so as to calculate the quantity of available REs in each PRB.

Embodiment 6

1. Calculate a quantity of available REs in each PRB based on the following formula:

$$N'_{RE}=N_{sc}^{RB} \cdot N_{symbol}^{sh} - N_{DMRS}^{PRB} - N_{oh}^{PRB} - N$$

For meanings of the parameters in the formula, refer to step 1 in Embodiment 5. Certainly, the parameter N in Embodiment 5 is not included in the formula.

Optionally, $N_{oh}^{PRB}$ in the formula includes an overhead of SCI. The overhead of the SCI may include overheads of SCI in two stages. The 1$^{st}$-stage SCI is carried in the PSCCH, and the 2$^{nd}$-stage SCI is carried in the PSSCH.

2. Calculate a quantity of available REs in all PRBs in the allocated resource based on the following formula: $N_{RE}=\min(156,N'_{RE}) \cdot n_{PRB} - M$ where $N_{RE}$ denotes the quantity of available REs in all PRBs; $n_{PRB}$ denotes a quantity of available PRBs, for example, a quantity of available PRBs in the allocated resource; and M is a parameter related to the target resource overhead.

Optionally, M=144. M is a value predefined in a protocol.

Optionally, M is calculated based on a resource configured for the SCI.

Optionally, M is obtained through negotiation by the terminal device.

Optionally, M is fed back by the receiving terminal device to the transmitting terminal device.

3. This step is the same as steps 3, 4, and 5 in Embodiment 1. Specifically, in step 3 and subsequent steps in this embodiment, a TBS calculation process for the Uu interface, for example, a TBS calculation process for the PUSCH, may be used.

According to Embodiment 6, during calculation of a TBS, considering that each PSSCH may include only one PSCCH (target resource overhead), M is subtracted from a quantity of available REs in all PRBs, and the TBS is subsequently calculated based on the obtained quantity of available REs.

Optionally, in Embodiment 6, M is related to at least one of feedback information configuration, PSCCH configuration, AGC configuration, PTRS configuration, CSI-RS configuration, a carrier frequency, numerology configuration, CSI configuration, and a transmission type. Alternatively, M is a value predefined in a protocol, configured by a network device or terminal device, obtained through negotiation by the terminal device, or fed back by the receiving terminal device to the transmitting terminal device.

For example, the network device preconfigures a mapping relationship between numerology and M or between M and a quantity of symbols for the AGC; and the terminal device obtains M based on the configured numerology or the configured quantity of symbols for the AGC, so as to calculate the quantity of available REs in all PRBs.

Embodiment 7

1. Calculate a quantity of available REs in each PRB based on the following formula:

$$N'_{RE}=(N_{sc}^{RB} \cdot N_{symbol}^{sh} - N_{DMRS}^{PRB} - N_{oh}^{PRB}) * alpha\_1$$

where $N_{sc}^{RB}$ denotes a quantity of subcarriers in a PRB, $N_{symbol}^{sh}$ denotes a size of the allocated resource, $N_{DMRS}^{PRB}$ denotes a resource overhead of a DMRS in a PRB, $N_{oh}^{PRB}$ is a parameter predefined in a protocol, (pre)configured by a network device, configured by a terminal device, obtained based on negotiation by the terminal device, or fed back by the receiving terminal device to the transmitting terminal device, alpha_1 is a parameter related to the target resource overhead, and 0<alpha_1≤1.

2. Refer to steps 2, 3, 4, and 5 in Embodiment 1. Specifically, in step 2 and subsequent steps in this embodiment, a TBS calculation process for the Uu interface, for example, a TBS calculation process for the PUSCH, may be used.

According to Embodiment 7, during calculation of a TBS, a scale factor (corresponding to the third parameter in the foregoing description) is multiplied by a quantity of available REs in each PRB, and the TBS is subsequently calculated based on the obtained quantity of available REs.

Embodiment 8

1. Calculate a quantity of available REs in each PRB based on the following formula:

$$N'_{RE}=N_{sc}^{RB} \cdot N_{symbol}^{sh}-N_{DMRS}^{PRB}-N_{oh}^{PRB}$$

where $N'_{RE}$ denotes a quantity of available REs in a PRB; $N_{sc}^{RB}$ denotes a quantity of subcarriers in a PRB and is generally 12; $N_{symbol}^{sh}$ denotes a quantity of allocated symbols and may be specifically a quantity of allocated symbols for the PSSCH; $-N_{DMRS}^{PRB}$ denotes a resource overhead of a DMRS in a PRB; $N_{oh}^{PRB}$ is a parameter predefined in a protocol, (pre)configured by a network device, configured by a terminal device, obtained through negotiation by the terminal device, or fed back by the receiving terminal device to the transmitting terminal device.

2. Calculate a quantity of available REs in all PRBs in the allocated resource based on the following formula:

$$N_{RE}=\min(156, N'_{RE}) \cdot n_{PRB} \cdot alpha\_2$$

where $n_{PRB}$ denotes a quantity of allocated PRBs, alpha_2 is a parameter related to the target resource overhead, and 0<alpha_2≤1.

3. This step is the same as steps 3, 4, and 5 in Embodiment 1. Specifically, in step 3 and subsequent steps in this embodiment, a TBS calculation process for the Uu interface, for example, a TBS calculation process for the PUSCH, may be used.

According to Embodiment 8, during calculation of a TBS, a scale factor (corresponding to the fourth parameter in the foregoing description) is multiplied by a quantity of available REs in all PRBs in the allocated resource, that is, the fourth parameter is multiplied by a quantity of allocated PRBs, and the TBS is subsequently calculated based on an obtained value.

Embodiment 9

1. Calculate a quantity of available REs in each PRB based on the following formula:

$$N'_{RE}=N_{sc}^{RB} \cdot N_{symbol}^{sh}-N_{DMRS}^{PRB}-N_{oh}^{PRB}$$

For meanings of the parameters in the formula, refer to step 1 in Embodiment 8.

2. Calculate a quantity of available REs in all PRBs in the allocated resource based on the following formula:

$$N_{RE}=\min(156, N'_{RE}) \cdot n_{PRB}$$

where $N_{RE}$ denotes a quantity of available REs in all PRBs, and $n_{PRB}$ denotes a quantity of available PRBs.

3. Calculate an information median based on the following formula: $N_{info}=N_{RE} \cdot R \cdot Q_m \cdot \upsilon \cdot alpha\_3$ where R denotes a bit rate, $Q_m$ denotes a modulation order, $\upsilon$ denotes a quantity of layers, alpha_3 is a parameter related to the target resource overhead, and 0<alpha_3≤1.

4. Refer to steps 4 and 5 in Embodiment 1. In steps 1 and 2 as well as step 4 and subsequent steps in this embodiment, a TBS calculation process for the Uu interface, for example, a TBS calculation process for the PUSCH, may be used.

According to Embodiment 9, during calculation of a TBS, a scale factor (corresponding to the fifth parameter in the foregoing description) is multiplied by an information median, and the TBS is subsequently calculated based on an obtained value.

Embodiment 10

1. Calculate a quantity of available REs in each PRB based on the following formula:

$$N'_{RE}=N_{sc}^{RB} \cdot N_{symbol}^{sh}-N_{DMRS}^{PRB}-N_{oh}^{PRB}$$

where $N'_{RE}$ denotes a quantity of available REs in a PRB; $N_{sc}^{RB}$ denotes a quantity of subcarriers in a PRB and is generally 12; $N_{symbol}^{sh}$ denotes a quantity of allocated symbols and may be specifically a quantity of allocated symbols for the PSSCH; $N_{DMRS}^{PRB}$ denotes a resource overhead of a DMRS in a PRB; and $N_{oh}^{PRB}$ is a parameter related to the target resource overhead, and the target resource overhead may be resource overheads of at least one of the AGC, PSCCH, SFCI, DMRS, PTRS, CSI-RS, and GP.

2. Refer to steps 2, 3, 4, and 5 in Embodiment 1. Specifically, in step 2 and subsequent steps in this embodiment, a TBS calculation process for the Uu interface, for example, a TBS calculation process for the PUSCH, may be used.

In Embodiment 10, during calculation of a TBS, $N_{oh}^{PRB}$ (corresponding to the first parameter in the foregoing description) is subtracted from a quantity of available REs in each PRB, and the TBS is subsequently calculated based on the obtained quantity of available REs.

Optionally, $N_{oh}^{PRB}$ is related to at least one of feedback information configuration, PSCCH configuration, AGC configuration, PTRS configuration, CSI-RS configuration, a carrier frequency, numerology configuration, CSI configuration, and a transmission type. Alternatively, $N_{oh}^{PRB}$ is a value predefined in a protocol, configured by a network device or terminal device, obtained through negotiation by the terminal device, or fed back by the receiving terminal device to the transmitting terminal device.

For example, an optional value of $N_{oh}^{PRB}$ is 12, 18, 24, or 30. Herein, rate matching for the GP is at least considered.

For another example, a relationship between feedback information and $N_{oh}^{PRB}$ is predefined. If no feedback resource is configured, $N_{oh}^{PRB}$ is N1; or if a feedback resource is configured, $N_{oh}^{PRB}$ is N2. In this implementation, a value of $N_{oh}^{PRB}$ may be obtained based on configuration of a feedback resource, so as to obtain a quantity of available REs.

It should be noted that, the TBS calculation methods described in Embodiment 1 to Embodiment 10 may be combined for use. For example, step 2 in Embodiment 1 may be replaced with step 2 in Embodiment 8. For another example, step 3 in Embodiment 1 may be replaced with step 3 in Embodiment 9. For still another example, referring to Embodiment 5, N may be further subtracted in the formula in step 1 in Embodiment 1. For still yet another example, referring to Embodiment 6, M may be further subtracted in the formula in step 2 in Embodiment 1.

It should also be noted that, in Embodiment 1 to Embodiment 10, parameters related to the target resource overhead, for example, $N_{oh\_sym}$ in Embodiment 1 to Embodiment 4, N in Embodiment 5, M in Embodiment 6, alpha_1 in Embodiment 7, alpha_2 in Embodiment 8, alpha_3 in Embodiment 9, and $N_{oh}^{PRB}$ in Embodiment 10 may all be obtained in at least one of the following manners:

(1) predefined in a protocol;
(2) preconfigured by a network device;
(3) configured by a network device;
(4) configured based on a transmission type (for example, broadcast, groupcast, or unicast), where the transmission type may be indicated in SCI/DCI, or may be obtained based on a destination ID (for example, there is a mapping relationship between a destination ID and a transmission type).
(5) indicated by SCI or downlink control information (Downlink Control Information, DCI);
(6) negotiated through radio resource control RRC configuration between terminal devices; and
(7) obtained based on feedback information.

For example, the foregoing parameter (parameter related to the target resource overhead) is related to the transmission type. The terminal device may predefine or preconfigure a value of the parameter based on different transmission types and protocols; or there are different configuration methods for different transmission types:

if the transmission type is broadcast transmission, the target resource overhead is a predefined/preconfigured value;
if the transmission type is unicast transmission, the target resource overhead is a configurable value;
if the transmission type is groupcast transmission, the overhead of the AGC may be a default value or is configurable.

For another example, the foregoing parameter (parameter related to the target resource overhead) may be indicated in SCI, and/or may be obtained through negotiation based on RRC configuration of the terminal device or through feedback. Specifically, for example:

The transmitting terminal device sends indication information indicating whether a corresponding target resource overhead is to be subtracted and a size of the target resource overhead during calculation of a sidelink TBS.

An overhead set is configured through SL-RRC. It is indicated in SCI that the target resource overhead is a value in the set.

When the parameter is obtained based on feedback information, an indication of the target resource overhead is carried in the feedback information to indicate whether a corresponding target resource overhead is included and/or a size of the target resource overhead.

Optionally, during calculation of a TBS, at least one resource overheads of the PSCCH, DMRS, AGC, GP, SFCI (PSFCH, CSI), PTRS, and CSI-RS, namely the target resource overhead, may alternatively be obtained in at least one of the foregoing (seven) manners.

The sidelink data transmission method provided in the present disclosure is described in detail above with reference to FIG. 1 and subsequent specific embodiments. The terminal device provided in the present disclosure is described in detail below with reference to FIG. 2.

Figure 2:
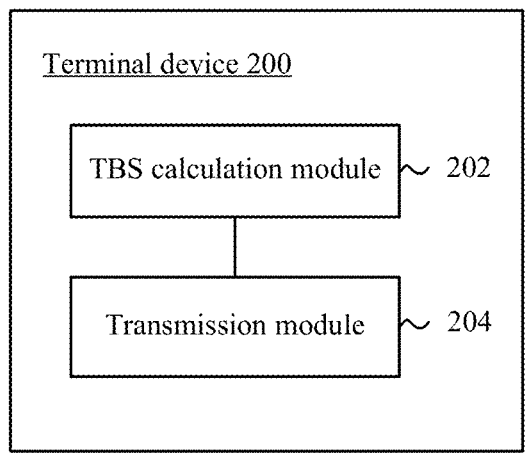
FIG. 2 is a schematic structural diagram of a terminal device according to an embodiment of the present disclosure.

FIG. 2 is a schematic structural diagram of a terminal device according to an embodiment of the present disclosure. As shown in FIG. 2, the terminal device 200 includes:

a TBS calculation module 202, may be configured to calculate a TBS based on a size of an allocated resource and a target resource overhead; and a transmission module 204, may be configured to transmit sidelink data based on the calculated TBS.

The terminal device provided in the embodiments of this specification may be a terminal device that sends sidelink data, or may be a terminal device that receives sidelink data. Certainly, the two terminal devices may be one terminal device because one terminal device may perform both a step of sending sidelink data and a step of receiving sidelink data.

According to the terminal device provided in the embodiments of this specification, a TBS is calculated based on a size of an allocated resource and a target resource overhead; and sidelink data is transmitted based on the calculated TBS. According to this embodiment of the present disclosure, the target resource overhead in the allocated resource is fully considered during calculation of a TBS, helping improve accuracy of the calculated TBS.

For the receiving terminal device, in this embodiment of the present disclosure, a case in which a transmission bit rate of a transmission block exceeds a bit rate allowed during demodulation can be avoided, a success rate of decoding is increased, and communication efficiency is improved.

Optionally, as an embodiment, the target resource overhead includes at least one of the following: a resource overhead of a PSCCH;
a resource overhead of a PSFCH;
a resource overhead of SFCI;
a resource overhead of a DMRS;
a resource overhead of a PTRS;
a resource overhead of a CSI-RS;
a resource overhead of AGC; and
a resource overhead of a GP.

Optionally, as an embodiment, the TBS calculation module 202 may be configured to perform at least one of the following:

subtracting a first parameter from a quantity of allocated symbols to calculate a quantity of available REs, and calculating the TBS based on an obtained value;
subtracting a second parameter from a quantity of available REs in the allocated resource, and calculating the TBS based on an obtained value, where the quantity of available REs in the allocated resource is calculated based on the size of the allocated resource; multiplying a third parameter by the quantity of available REs in the allocated resource, and calculating the TBS based on an obtained value, where the quantity of available REs in the allocated resource is calculated based on the size of the allocated resource; multiplying a fourth parameter by a quantity of available physical resource blocks PRBs in the allocated resource, and calculating the TBS based on an obtained value; and
multiplying an information median by a fifth parameter, and calculating the TBS based on an obtained value, where the information median is calculated based on the size of the allocated resource, where
the first parameter, the second parameter, the third parameter, the fourth parameter, and the fifth parameter are related to the target resource overhead, and the third parameter, the fourth parameter, and the fifth parameter are all greater than 0 and less than or equal to 1.

Optionally, as an embodiment, the TBS calculation module 202 may be configured to calculate a quantity $N'_{RE}$ of available REs in a PRB on an allocated symbol based on the following formula, and calculate the TBS based on $N'_{RE}$:

$$N'_{RE}=N_{sc}^{RB}\cdot(N_{symbol}^{sh}-N_{oh\_sym})-N_{DMRS}^{PRB}-N_{oh}^{PRB}$$

where $N_{sc}^{RB}$ denotes a quantity of subcarriers in a PRB, $N_{symbol}^{sh}$ denotes a quantity of allocated symbols, $N_{oh\_sym}$ denotes a quantity of symbols related to the target resource overhead, $N_{DMRS}^{PRB}$ denotes a resource overhead of a DMRS in a PRB on an allocated symbol, and $N_{oh}^{PRB}$ is a parameter predefined in a protocol, (pre)configured by a network device, or configured by a terminal device.

Optionally, as an embodiment, the TBS calculation module 202 may be configured to calculate a quantity $N'_{RE}$ of available REs in a PRB on an allocated symbol based on the following formula, and calculate the TBS based on $N'_{RE}$:

$$N'_{RE}=N_{sc}^{RB}\cdot N_{symbol}^{sh}-N_{DMRS}^{PRB}-N_{oh}^{PRB}$$

where $N_{sc}^{PRB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, and $N_{oh}^{PRB}$ is a parameter related to the target resource overhead.

Optionally, as an embodiment, the TBS calculation module 202 may be configured to calculate a quantity $N'_{RE}$ of available REs in a PRB on an allocated symbol based on the following formula, and calculate the TBS based on $N'_{RE}$:

$$N'_{RE}=N_{sc}^{RB}\cdot N_{symbol}^{sh}-N_{DMRS}^{PRB}-N_{oh}^{PRB}-N$$

where $N_{sc}^{RB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, $N_{oh}^{PRB}$ is a parameter predefined in a protocol, (pre)configured by a network device, or configured by a terminal device, and N is a parameter related to the target resource overhead.

Optionally, as an embodiment, the TBS calculation module 202 may be configured to calculate a quantity $N'_{RE}$ of available REs in a PRB on an allocated symbol based on the size of the allocated resource, calculate a quantity $N_{RE}$ of available REs in the allocated resource based on the following formula, and calculate the TBS based on $N_{RE}$:

$$N_{RE}=\min(156,N'_{RE})\cdot n_{PRB}-M$$

where $n_{PRB}$ denotes a quantity of available PRBs, and M is a parameter related to the target resource overhead.

Optionally, as an embodiment, the TBS calculation module 202 may be configured to calculate a quantity $N'_{RE}$ of available REs in a PRB on an allocated symbol based on the following formula, and calculate the TBS based on $N'_{RE}$:

$$N'_{RE}=(N_{sc}^{RB}\cdot N_{symbol}^{sh}-N_{DMRS}^{PRB}-N_{oh}^{PRB})*\mathrm{alpha\_1}$$

where $N_{sc}^{RB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, $N_{oh}^{PRB}$ is a parameter predefined in a protocol, (pre)configured by a network device, or configured by a terminal device, alpha_1 is a parameter related to the target resource overhead, and 0<alpha_1≤1.

Optionally, as an embodiment, the TBS calculation module 202 may be configured to calculate a quantity $N'_{RE}$ of available REs in a PRB on an allocated symbol based on the size of the allocated resource, calculate a quantity $N_{RE}$ of available REs in the allocated resource based on the following formula, and calculate the TBS based on $N_{RE}$:

$$N_{RE}=\min(156,N'_{RE})\cdot n_{PRB}\cdot\mathrm{alpha\_2}$$

$n_{PRB}$ denotes a quantity of allocated PRBs, alpha_2 is a parameter related to the target resource overhead, and 0<alpha_2≤1.

Optionally, as an embodiment, the TBS calculation module 202 may be configured to calculate a quantity $N_{RE}$ of available REs based on the size of the allocated resource, calculate an information median $N_{info}$ based on the following formula, and calculate the TBS based on $N_{info}$:

$$N_{info}=N_{RE}\cdot R\cdot Q_m\cdot\upsilon\cdot\mathrm{alpha\_3}$$

where $N_{RE}$ denotes a quantity of available REs in the allocated resource, R denotes a bit rate, $Q_m$ denotes a modulation order, $\upsilon$ denotes a quantity of layers, alpha_3 is a parameter related to the target resource overhead, and 0<alpha_3≤1.

Optionally, as an embodiment, the target resource overhead includes the resource overhead of the PSCCH and is calculated based on configuration of the PSCCH.

Optionally, as an embodiment, the TBS calculation module 202 may be further configured to:

calculate the resource overhead of the PSCCH based on a resource occupied by the PSCCH during blind detection; or calculate the resource overhead of the PSCCH based on a first resource overhead of a first PSCCH and a second resource overhead of a second PSCCH, where the first PSCCH is predefined or is configured or preconfigured by a network device, and the second PSCCH is indicated by using the first PSCCH.

Optionally, as an embodiment, the TBS calculation module 202 may be configured to calculate the TBS based on the size of the allocated resource and a parameter related to the target resource overhead, where the parameter is obtained in at least one of the following manners:

predefined in a protocol;
preconfigured by a network device;
configured by a network device;
configured based on a transmission type;
indicated by using sidelink control information SCI or downlink control information DCI;
negotiated through radio resource control RRC configuration between terminal devices; and
obtained based on feedback information.

Optionally, as an embodiment, the TBS calculation module 202 may also be configured to use a TBS for initial transmission of sidelink data as a TBS of retransmission sidelink data.

For the terminal device 200 provided in the present disclosure, reference may be made to the corresponding procedure of the method 100 provided in the present disclosure, and each unit/module in the terminal device 200 and the foregoing other operations and/or functions are used to implement the corresponding procedure of the method 100, and a same or equivalent effect can be achieved. For brevity, details are not described herein again.

Figure 3:
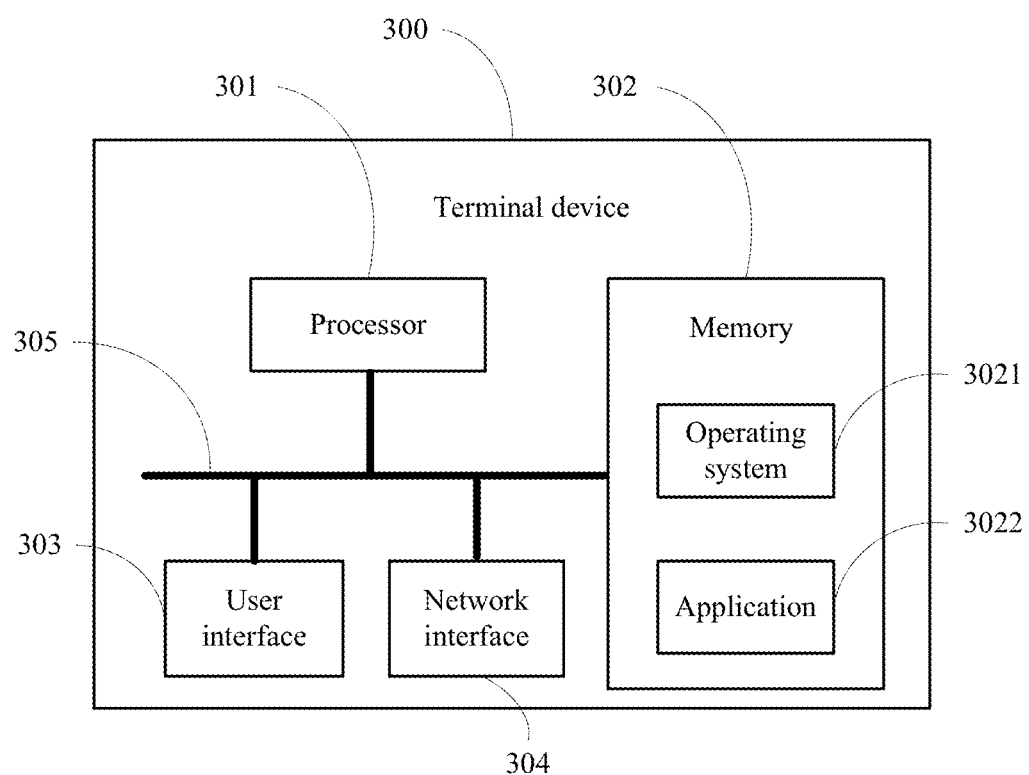
FIG. 3 is a schematic structural diagram of a terminal device according to another embodiment of the present disclosure.

FIG. 3 is a structural block diagram of a terminal device according to another embodiment of the present disclosure. As shown in FIG. 3, the terminal device 300 includes: at least one processor 301, a memory 302, at least one network interface 304, and a user interface 303. All components of the terminal device 300 are coupled together by using the bus system 305. It can be understood that the bus system 305 is configured to implement a connection and communication between these components. In addition to a data bus, the bus system 305 may include a power bus, a control bus, and a status signal bus. However, for clarity of description, various buses are marked as the bus system 305 in FIG. 3.

The user interface 303 may include a display, a keyboard, or a click device (for example, a mouse, a trackball (trackball), a touchpad, or a touchscreen).

It may be understood that the memory 302 in this embodiment of the present disclosure may be a volatile memory or a non-volatile memory, or may include both a volatile memory and a non-volatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example rather than limitative description, many forms of RAMs are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 302 of the system and the method described in the embodiments of the present disclosure is intended to include, but is not limited to, these and any other suitable types of memories.

In some implementations, the memory 302 stores the following element: an executable module or a data structure, a subset thereof, or an extended set thereof: an operating system 3021 and an application program 3022.

The operating system 3021 includes various system programs, for example, a framework layer, a kernel library layer, and a driver layer, and is configured to implement various basic services and process hardware-based tasks. The application 3022 includes various applications, for example, a media player, and a browser, to implement various application services. A program for implementing the method in the embodiments of the present disclosure may be included in the application 3022.

In this embodiment of the present disclosure, the terminal device 300 further includes a computer program that is stored in the memory 302 and that can run on the processor 301, and when the computer program is executed by the processor 301, the steps of the method 100 are implemented.

The method disclosed in the embodiments of the present disclosure may be applied to the processor 301 or implemented by the processor 301. The processor 301 may be an integrated circuit chip having a signal processing capability. During implementation, the steps of the foregoing method may be completed by hardware integrated logic circuits in the processor 301 or instructions in a form of software. The foregoing processor 301 may be a general-purpose processor, a digital signal processor (DSP), an application specific integrated circuit (ASIC), a field programmable gate array (FPGA) or another programmable logic component, a discrete gate or a transistor logic component, or a discrete hardware component. The processor 301 may implement or execute the methods, steps, and logic block diagrams disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature computer-readable storage medium in this field such as a random access memory, a flash memory, a read-only memory, a programmable read-only memory or an electrically erasable programmable memory, or a register. The computer-readable storage medium is located in the memory 302, and the processor 301 reads information from the memory 302 and completes the steps of the foregoing method in combination with hardware of the processor 301. Specifically, the computer-readable storage medium stores a computer program, and when the computer program is executed by the processor 301, the steps of the foregoing embodiment of method 100 are performed.

It can be understood that those embodiments described in the embodiments of the present disclosure can be implemented with hardware, software, firmware, middleware, microcode, or a combination thereof. For hardware implementation, a processing unit may be implemented in one or more Application Specific Integrated Circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in the present disclosure.

For implementation with software, technologies described in the embodiments of the present disclosure may be implemented by executing functional modules (for example, a process and a function) in the embodiments of the present disclosure. Software code may be stored in a memory and executed by a processor. The memory may be implemented in the processor or outside the processor.

The terminal device 300 can implement each process implemented by the terminal device in the foregoing embodiments, and can achieve the same or equivalent technical effect. To avoid repetition, details are not described herein again.

The present disclosure further provides a computer-readable storage medium. The computer-readable storage medium stores a computer program, and when the computer program is executed by a processor, the processes in the foregoing method embodiment 100 are implemented, and a same technical effect can be achieved. To avoid repetition, details are not described herein again. An example of the computer-readable storage medium includes a non-transitory computer-readable storage medium, for example, a read-only memory (ROM for short), a random access memory (RAM for short), a magnetic disk, an optical disc, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the related art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A sidelink data transmission method, wherein the method is performed by a terminal device, and comprises:
calculating a transport block size (TBS) based on a size of an allocated resource and a target resource overhead; wherein the target resource overhead comprises a resource overhead of a physical sidelink feedback channel (PSFCH); and
transmitting sidelink data based on the calculated TBS;
wherein the calculating a TBS based on a size of an allocated resource and a target resource overhead comprises: calculating the TBS based on the size of the allocated resource and a parameter related to the target resource overhead, wherein the parameter is related to the resource overhead of the PSFCH and is obtained in at least one of the following manners:
preconfigured by a network device;
configured by a network device; or,
indicated by using sidelink control information (SCI) or downlink control information (DCI).

2. The method according to claim 1, wherein the target resource overhead further comprises at least one of the following:
a resource overhead of a physical sidelink control channel (PSCCH);
a resource overhead of sidelink feedback control information (SFCI);
a resource overhead of a demodulation reference signal (DMRS);
a resource overhead of a phase-tracking reference signal (PTRS);
a resource overhead of a channel state information-reference signal (CSI-RS);
a resource overhead of automatic gain control (AGC); or
a resource overhead of a guard period (GP).

3. The method according to claim 1, wherein the calculating a TBS based on a size of an allocated resource and a target resource overhead comprises at least one of the following:
subtracting a first parameter from a quantity of allocated symbols to calculate a quantity of available resource elements (REs) in a physical resource block (PRB), and calculating the TBS based on an obtained value;
subtracting a second parameter from a quantity of available REs in the allocated resource, and calculating the TBS based on an obtained value, wherein the quantity of available REs in the allocated resource is calculated based on the size of the allocated resource;
multiplying a third parameter by the quantity of available REs in the allocated resource, and calculating the TBS based on an obtained value, wherein the quantity of available REs in the allocated resource is calculated based on the size of the allocated resource;
multiplying a fourth parameter by a quantity of available PRBs in the allocated resource, and calculating the TBS based on an obtained value; or
multiplying an information median by a fifth parameter, and calculating the TBS based on an obtained value, wherein the information median is calculated based on the size of the allocated resource, wherein
the first parameter, the second parameter, the third parameter, the fourth parameter, and the fifth parameter are related to the target resource overhead, and the third parameter, the fourth parameter, and the fifth parameter are all greater than 0 and less than or equal to 1.

4. The method according to claim 1, wherein the calculating a TBS based on a size of an allocated resource and a target resource overhead comprises:
calculating a quantity $N'_{RE}$ of available REs in a PRB on an allocated symbol based on the following formula, and calculating the TBS based on $N'_{RE}$:

$$N'_{RE} = N_{sc}^{RB} \cdot (N_{symbol}^{sh} - N_{oh\_sym}) - N_{DMRS}^{PRB} - N_{oh}^{PRB}$$

where $N_{sc}^{RB}$ denotes a quantity of subcarriers in a PRB, $N_{symbol}^{sh}$ denotes a quantity of allocated symbols, $N_{oh\_sym}$ denotes a quantity of symbols related to the target resource overhead, $N_{DMRS}^{PRB}$ denotes a resource overhead of a DMRS in a PRB on an allocated symbol, and $N_{oh}^{PRB}$ is a parameter predefined in a protocol, (pre)configured by a network device, or configured by a terminal device.

5. The method according to claim 1, wherein the calculating a TBS based on a size of an allocated resource and a target resource overhead comprises:
calculating a quantity $N'_{RE}$ of available REs in a PRB on an allocated symbol based on the following formula, and calculating the TBS based on $N'_{RE}$:

$$N'_{RE} = N_{sc}^{RB} \cdot N_{symbol}^{sh} - N_{DMRS}^{PRB} - N_{oh}^{PRB}$$

where $N_{sc}^{RB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, and $N_{oh}^{PRB}$ is a parameter related to the target resource overhead.

6. The method according to claim 1, wherein the calculating a TBS based on a size of an allocated resource and a target resource overhead comprises:
calculating a quantity $N'_{RE}$ of available REs in a PRB on an allocated symbol based on the following formula, and calculating the TBS based on $N'_{RE}$:

$$N'_{RE} = N_{sc}^{RB} \cdot N_{symbol}^{sh} - N_{DMRS}^{PRB} - N_{oh}^{PRB} - N$$

where $N_{sc}^{RB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, $N_{oh}^{PRB}$ is a parameter predefined in a protocol, (pre)configured by a network device, or configured by a terminal device, and N is a parameter related to the target resource overhead.

7. The method according to claim 1, wherein the calculating a TBS based on a size of an allocated resource and a target resource overhead comprises:
calculating a quantity $N'_{RE}$ of available REs in a PRB on an allocated symbol based on the size of the allocated resource, calculating a quantity $N_{RE}$ of available REs in the allocated resource based on the following formula, and calculating the TBS based on $N_{RE}$:

$$N_{RE}=\min(156,N'_{RE}) \cdot n_{PRB} - M$$

wherein $n_{PRB}$ denotes a quantity of available PRBs in the allocated resource, and M is a parameter related to the target resource overhead.

8. The method according to claim 1, wherein the calculating a TBS based on a size of an allocated resource and a target resource overhead comprises:
calculating a quantity $N'_{RE}$ of available REs in a PRB on an allocated symbol based on the following formula, and calculating the TBS based on $N'_{RE}$:

$$N'_{RE}=(N_{sc}^{RB} \cdot N_{symbol}^{sh} - N_{DMRS}^{PRB} - N_{oh}^{PRB}) * \text{alpha}\_1$$

where $N_{sc}^{RB}$ denotes a quantity of subcarriers in a PRB, $N_{symbol}^{sh}$ denotes a quantity of allocated symbols, $N_{DMRS}^{PRB}$ denotes a resource overhead of a DMRS in a PRB on an allocated symbol, $N_{oh}^{PRB}$ is a parameter predefined in a protocol, (pre)configured by a network device, configured by a terminal device, alpha_1 is a parameter related to the target resource overhead, and 0<alpha_1≤1.

9. The method according to claim 1, wherein the calculating a TBS based on a size of an allocated resource and a target resource overhead comprises:
calculating a quantity $N'_{RE}$ of available REs in a PRB on an allocated symbol based on the size of the allocated resource, calculating a quantity $N_{RE}$ of available REs in the allocated resource based on the following formula, and calculating the TBS based on $N_{RE}$;

$$N_{RE}=\min(156,N'_{RE}) \cdot n_{PRB} \cdot \text{alpha}\_2$$

where $n_{PRB}$ denotes a quantity of allocated PRBs and is a parameter related to the target resource overhead, and 0<alpha_2≤1.

10. The method according to claim 1, wherein the calculating a TBS based on a size of an allocated resource and a target resource overhead comprises:
calculating a quantity $N_{RE}$ of available REs based on the size of the allocated resource, calculating an information median $N_{info}$ based on the following formula, and calculating the TBS based on $N_{info}$:

$$N_{info}=N_{RE} \cdot R \cdot Q_m \cdot \upsilon \cdot \text{alpha}\_3$$

where $N_{RE}$ denotes a quantity of available REs in the allocated resource, R denotes a bit rate, $Q_m$ denotes a modulation order, $\upsilon$ denotes a quantity of layers, alpha_3 is a parameter related to the target resource overhead, and 0<alpha_3≤1.

11. The method according to claim 2, wherein the target resource overhead comprises the resource overhead of the PSCCH and is calculated based on configuration of the PSCCH.

12. The method according to claim 11, wherein before the calculating a TBS based on a size of an allocated resource and a target resource overhead, the method further comprises:
calculating the resource overhead of the PSCCH based on a resource occupied by the PSCCH during blind detection; or calculating the resource overhead of the PSCCH based on a first resource overhead of a first PSCCH and a second resource overhead of a second PSCCH, wherein the first PSCCH is predefined or is configured or preconfigured by a network device, and the second PSCCH is indicated by using the first PSCCH.

13. The method according to claim 11, wherein a parameter related to at least one of the resource overhead of the PSCCH or the resource overhead of the SFCI is obtained in at least one of the following manners:
predefined in a protocol;
preconfigured by a network device;
configured by a network device;
configured based on a transmission type;
indicated by using sidelink control information (SCI) or downlink control information (DCI);
negotiated through radio resource control (RRC) configuration between terminal devices; or
obtained based on feedback information.

14. The method according to claim 1, wherein when the sidelink data is retransmission sidelink data, the method further comprises:
using a TBS for initial transmission of the sidelink data as a TBS of the retransmission sidelink data.

15. A terminal device, comprising a memory, a processor, and a computer program stored in the memory and capable of running on the processor, wherein the computer program, when executed by the processor of the terminal device, causes the terminal device to perform:
calculating a TBS based on a size of an allocated resource and a target resource overhead; wherein the target resource overhead comprise a resource overhead of a physical sidelink feedback channel (PSFCH); and transmitting sidelink data based on the calculated TBS;
wherein the calculating a TBS based on a size of an allocated resource and a target resource overhead comprises: calculating the TBS based on the size of the allocated resource and a parameter related to the target resource overhead, wherein the parameter is related to the resource overhead of the PSFCH and is obtained in at least one of the following manners:
preconfigured by a network device;
configured by a network device: or,
indicated by using sidelink control information (Sc) or downlink control information (DCI).

16. The terminal device according to claim 15, wherein the target resource overhead further comprises at least one of the following:
a resource overhead of a PSCCH;
a resource overhead of SFCI;
a resource overhead of a DMRS;
a resource overhead of a PTRS;
a resource overhead of a CSI-RS;
a resource overhead of AGC; or
a resource overhead of a GP.

17. The terminal device according to claim 15, wherein the computer program, when executed by the processor of the terminal device, causes the terminal device to further perform:
subtracting a first parameter from a quantity of allocated symbols to calculate a quantity of available REs in a PRB, and calculating the TBS based on an obtained value;
subtracting a second parameter from a quantity of available REs in the allocated resource, and calculating the TBS based on an obtained value, wherein the quantity of available REs in the allocated resource is calculated based on the size of the allocated resource;

multiplying a third parameter by the quantity of available REs in the allocated resource, and calculating the TBS based on an obtained value, wherein the quantity of available REs in the allocated resource is calculated based on the size of the allocated resource;

multiplying a fourth parameter by a quantity of available physical resource blocks (PRBs) in the allocated resource, and calculating the TBS based on an obtained value; or multiplying an information median by a fifth parameter, and calculating the TBS based on an obtained value, wherein the information median is calculated based on the size of the allocated resource, wherein the first parameter, the second parameter, the third parameter, the fourth parameter, and the fifth parameter are related to the target resource overhead, and the third parameter, the fourth parameter, and the fifth parameter are all greater than 0 and less than or equal to 1.

18. The terminal device according to claim 15, wherein the target resource overhead comprises the resource overhead of the PSCCH and is calculated based on configuration of the PSCCH, a parameter related to at least one of the resource overhead of the PSCCH or the resource overhead of the SFCI is obtained in at least one of the following manners:

predefined in a protocol;
preconfigured by a network device;
configured by a network device;
configured based on a transmission type;
indicated by using SCI or DCI;
negotiated through RRC configuration between terminal devices; or
obtained based on feedback information.

19. The terminal device according to claim 15, wherein when the sidelink data is retransmission sidelink data, the computer program, when executed by the processor of the terminal device, causes the terminal device to further perform: using a TBS for initial transmission of the sidelink data as a TBS of the retransmission sidelink data.

20. A non-transitory computer-readable storage medium, wherein the non-transitory computer-readable storage medium stores a computer program, and when the computer program is executed by a processor to implement:

calculating a transport block size (TBS) based on a size of an allocated resource and a target resource overhead: wherein the target resource overhead comprises a resource overhead of a physical sidelink feedback channel (PSFCH); and transmitting sidelink data based on the calculated TBS;

wherein the calculating a TBS based on a size of an allocated resource and a target resource overhead comprises: calculating the TBS based on the size of the allocated resource and a parameter related to the target resource overhead, wherein the parameter is related to the resource overhead of the PSFCH and is obtained in at least one of the following manners:

preconfigured by a network device;
configured by a network device; or,
indicated by using sidelink control information (SCI) or downlink control information (DCI).

* * * * *